United States Patent
Salamatov et al.

(10) Patent No.: US 9,647,957 B2
(45) Date of Patent: *May 9, 2017

(54) THROTTLING USAGE OF RESOURCES

(71) Applicant: Microsoft Technology Licensing, LLC, Redmond, WA (US)

(72) Inventors: Andrew A. Salamatov, Seattle, WA (US); Giselli Panontini De Souza Sana, Redmond, WA (US); David A. Sterling, Apex, NC (US); Razvan Mathias, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 234 days.

This patent is subject to a terminal disclaimer.

(21) Appl. No.: 14/624,397

(22) Filed: Feb. 17, 2015

(65) Prior Publication Data

US 2015/0180798 A1  Jun. 25, 2015

Related U.S. Application Data (63) Continuation of application No. 12/958,134, filed on Dec. 1, 2010, now Pat. No. 8,977,677.

(51) Int. Cl.
  *G06F 15/173* (2006.01)
  *H04L 12/927* (2013.01)
  *G06F 9/50* (2006.01)
  *H04L 29/08* (2006.01)

(52) U.S. Cl.
  CPC .......... *H04L 47/805* (2013.01); *G06F 9/5027* (2013.01); *H04L 67/10* (2013.01); *G06F 2209/504* (2013.01); *G06F 2209/5013* (2013.01); *Y02B 60/142* (2013.01)

(58) Field of Classification Search
  CPC ....................................... H04L 67/10

USPC .................................................. 709/203, 225
See application file for complete search history.

(56) References Cited

U.S. PATENT DOCUMENTS

| | | | |
|---|---|---|---|
| 4,642,756 A | 2/1987 | Sherrod | |
| 5,109,512 A | 4/1992 | Bahr et al. | |
| 5,375,244 A | 12/1994 | McNair | |
| 5,515,538 A | 5/1996 | Kleiman | |
| 5,774,718 A | 6/1998 | Aoshima et al. | |
| 6,477,561 B1 | 11/2002 | Robsman | |
| 6,701,311 B2 | 3/2004 | Biebesheimer et al. | |
| 6,754,664 B1 | 6/2004 | Bush | |
| 6,829,713 B2 | 12/2004 | Cooper et al. | |
| 7,165,088 B2 | 1/2007 | Cohen et al. | |
| 7,206,845 B2 | 4/2007 | Banning et al. | |
| 7,254,607 B2 | 8/2007 | Hubbard et al. | |
| 7,353,538 B2 | 4/2008 | Sample | |

(Continued)

OTHER PUBLICATIONS

Office Action, U.S. Appl. No. 15/089,766, filed Apr. 4, 2016, Office Action Notification Date: Nov. 4, 2016, 21 Pages.

(Continued)

*Primary Examiner* — Jason Recek
(74) *Attorney, Agent, or Firm* — Jared S. Goff; Goff Patent Law PLLC (57) ABSTRACT

A computing device provides a first server. The first server receives a primary request associated with a client. In response to receiving the primary request, the first server processes the primary request to generate a response message. As part of processing the primary request, the first server sends a secondary request to a second server after a delay period expires. The second server accesses a resource as part of processing of the secondary request. The duration of the delay period depends at least in part on a recent latency level of the client with regard to the resource. In this way, the first server throttles access to the resource.

20 Claims, 7 Drawing Sheets

(56) References Cited

U.S. PATENT DOCUMENTS

| | | | |
|---|---|---|---|
| 7,519,734 | B1 | 4/2009 | Dumitriu et al. |
| 7,783,666 | B1 | 8/2010 | Zhuge et al. |
| 7,802,238 | B2 | 9/2010 | Clinton |
| 7,840,647 | B2 | 11/2010 | Kloba et al. |
| 8,037,186 | B2 | 10/2011 | Dumitriu et al. |
| 8,103,769 | B1 | 1/2012 | Weiser et al. |
| 8,112,768 | B2 | 2/2012 | Wu |
| 8,190,593 | B1 | 5/2012 | Dean |
| 8,250,196 | B2 | 8/2012 | Demir et al. |
| 8,312,073 | B2 | 11/2012 | Jakobsson |
| 8,468,251 | B1 | 6/2013 | Pijewski et al. |
| 9,305,274 | B2 | 4/2016 | Sterling et al. |
| 2002/0138643 | A1 | 9/2002 | Shin et al. |
| 2003/0070000 | A1* | 4/2003 | Coker .................. G06F 9/547 719/318 |
| 2005/0076335 | A1* | 4/2005 | Cavage ............... G06F 9/3851 718/100 |
| 2006/0090163 | A1 | 4/2006 | Karisson et al. |
| 2006/0135258 | A1 | 6/2006 | Maheshwari et al. |
| 2006/0190482 | A1 | 8/2006 | Kishan et al. |
| 2006/0294228 | A1 | 12/2006 | Almstrom |
| 2007/0118653 | A1 | 5/2007 | Bindal |
| 2007/0233693 | A1 | 10/2007 | Baxter et al. |
| 2007/0233694 | A1 | 10/2007 | Baxter |
| 2007/0234327 | A1 | 10/2007 | Baxter et al. |
| 2008/0120620 | A1 | 5/2008 | Lett et al. |
| 2008/0240144 | A1 | 10/2008 | Kruse et al. |
| 2009/0055829 | A1 | 2/2009 | Gibson |
| 2009/0063617 | A1* | 3/2009 | Calow ................. H04L 12/66 709/203 |
| 2009/0100435 | A1 | 4/2009 | Papaefstathiou et al. |
| 2009/0172191 | A1 | 7/2009 | Dumitriu et al. |
| 2009/0241176 | A1* | 9/2009 | Beletski ............... G06F 9/505 726/7 |
| 2010/0043004 | A1 | 2/2010 | Tambi et al. |
| 2010/0153781 | A1* | 6/2010 | Hanna ................ G06F 21/577 714/37 |
| 2010/0205607 | A1 | 8/2010 | Shivanna et al. |
| 2010/0268798 | A1 | 10/2010 | Kourkouzelis et al. |
| 2011/0087776 | A1 | 4/2011 | Tabone et al. |
| 2011/0153724 | A1 | 6/2011 | Raja et al. |
| 2011/0153828 | A1 | 6/2011 | Park et al. |
| 2011/0153839 | A1* | 6/2011 | Rajan ................... H04L 47/32 709/227 |
| 2011/0161488 | A1 | 6/2011 | Anderson et al. |
| 2011/0161964 | A1 | 6/2011 | Piazza et al. |
| 2011/0173038 | A1 | 7/2011 | Moon et al. |
| 2012/0030339 | A1 | 2/2012 | Dumitriu et al. |
| 2012/0110572 | A1 | 5/2012 | Kodi et al. |
| 2012/0143992 | A1 | 6/2012 | Salamatov et al. |
| 2012/0174121 | A1 | 7/2012 | Treat et al. |
| 2013/0152097 | A1 | 6/2013 | Boctor et al. |
| 2013/0185427 | A1 | 7/2013 | Sterling et al. |
| 2015/0032896 | A1 | 1/2015 | Dumitriu et al. |

OTHER PUBLICATIONS

Office Action, U.S. Appl. No. 13/350,827, filed Jan. 16, 2012, Office Action Notification Date: Jul. 29, 2015, 6 Pages.

Office Action, U.S. Appl. No. 13/315,382, filed Dec. 9, 2011, Office Action Notification Date: Apr. 30, 2015, 33 Pages.

Office Action, U.S. Appl. No. 13/350,827, filed Jan. 16, 2012, Office Action Notification Date: Mar. 16, 2015, 8 Pages.

Office Action, U.S. Appl. No. 15/053,847, filed Feb. 25, 2016, Office Action Notification Date: Sep. 20, 2016, 16 Pages.

Cobb, Michael, "Using Resource Allocation Management to Prevent DOS and other Attacks", Retrieved at <<http://searchsecurity.techtarget.co.uk/tip/0,289483,sid180_gci1507648,00.html>>, Mar. 31, 2010, pp. 16.

Osborn, Stu, "Determining Health and Wellness of an OCS Deployment—IM and Presence", Retrieved at <<http://blogs.technet.com/b/nexthop/archive/2008/07/28/determining-health-and-wellness-of-an-ocs-deployment-im-andpresence.aspx>>, Jul. 2008, pp. 5.

"How BizTalk Server Implements Host Throttling", Retrieved at <<Ahttp://msdn.microsoft.com/en-us/library/aa559893(v=BTS.70).aspx>>, Retrieved Date: Oct. 19, 2011, pp. 13.

Anderson, et al., "Insider Attack and Real-Time Data Mining of User Behavior", Retrieved at <<http://ieeexplore.ieee.org/stamp/stamp.jsp?tp=&arnumber=5388654>>, Proceedings of IBM Journal of Research and Development, vol. 51, No. 3/4, May/Jul. 2007, pp. 465-475.

Grimm, et al., "Na Kika Secure Service Execution and Composition in an Open Edge-Side Computing Network", Retrieved at <<http://static.usenix.org/event/nsdi06/tech/full_papers/grimm/grimm.pdf>>, in the Proceedings of the 3rd Symposium on Networked Systems Design and Implementation (NSDI '06), May 8, 2006, 14 Pages.

"What's Behind Network Downtime", Retrieved at <<http://www-935.ibm.com/services/sg/gts/pdf/200249.pdf>>, May 2008, 12 Pages.

"New-Workflow-MakeItEasy Authoring Workflows using PowerShell Extended Syntax", Retrieved at <<http://roualin.fr/new-workflow-makeiteasy-authoring-workftows-using-powershell-extended-syntax-2/>>, Jul. 21, 2012, 6 Pages.

Mathur, et al., "Identifying and Throttling Tasks Based on Task Interactivity" U.S. Appl. No. 13/736,080, filed Jan. 8, 2013, 52 Pages.

IBM-Tivoli-Workload-Automation accessed at: http://www-01.ibm.com/software/tivoli/products/workloadautomation/features.html; accessed on: Sep. 27, 2014, 2 pages.

"Determining Health and Wellness of an OCS Deployment", Microsoft Office Communications Server blog published Jul. 24, 2008, 5 Pages.

"How BizTalk Server Implements Host Throttling", Copyright Date 2010, 7 Pages.

Cobb, Michael; "Using Resource Allocation Management to Prevent DOS and Other Attacks", published Mar. 10, 2010, 3 Pages.

Office Action, U.S. Appl. No. 13/315,382, filed Dec. 9, 2011, Office Action Notification Date: Apr. 9, 2014, 29 Pages.

Office Action, U.S. Appl. No. 13/315,382, filed Dec. 9, 2011, Office Action Notification Date: Sep. 11, 2014, 26 Pages.

Office Action, U.S. Appl. No. 13/350,827, filed Jan. 16, 2012, Office Action Notification Date: Sep. 12, 2014, 12 Pages.

Office Action, U.S. Appl. No. 13/736,080, filed Jan. 8, 2013, Office Action Notification Date: Oct. 2, 2014, 31 Pages.

Office Action, U.S. Appl. No. 13/736,080, filed Jan. 8, 2013, Office Action Notification Date: Jan. 15, 2015, 12 Pages.

* cited by examiner

THROTTLING USAGE OF RESOURCES

RELATED APPLICATIONS

The present application is a continuation of U.S. application Ser. No. 12/958,134, filed Dec. 1, 2010, which is incorporated herein by reference. If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

BACKGROUND

Contention for resources is a common occurrence in modern server systems. Contention for a resource arises when two or more concurrently running programs want to access the resource at the same time. Because the resource cannot be accessed by two running programs at the same time, one of the running programs waits while the other running program accesses the resource. As more programs try to access the resource, each of the programs may have to wait longer periods of time to access the resource.

Malicious entities can take advantage of contention for a resource when attempting to attack a server system. For example, a malicious entity can launch a denial of service (DoS) attack by sending a large number of illegitimate requests to a server system. In response the requests, the server system starts new processes that attempt to access the same resource. These new processes are in contention for the resource with processes started in response to legitimate requests. Because the processes started in response to illegitimate requests outnumber the processes started in response to legitimate requests, the processes started in response to legitimate requests may not be able to access the resource. In this way, the malicious entity can prevent clients from accessing the resource for legitimate purposes.

Furthermore, one or more process running on behalf of a first legitimate client can attempt to access a resource heavily. At the same time, processes running on behalf of other legitimate clients may need to sporadically access the resource. In such circumstances, the first legitimate client's processes can effectively monopolize the resource, preventing the other clients' processes from accessing the resource in a timely manner.

SUMMARY

A computing device provides a first server. The first server throttles access to a resource of a second server. The first server receives a primary request. The primary request is associated with a client. As part of processing the primary request, the first server calculates the duration of a delay period. The duration of the delay period depends at least in part on the client's recent latency level with regard to the resource. The first server sends a secondary request to a second server after the delay period expires. The second server accesses the resource as part of processing of the secondary request. In some instances, waiting for the delay period to expire before sending the secondary request can prevent the client from monopolizing the resource.

This summary is provided to introduce a selection of concepts. These concepts are further described below in the Detailed Description. This summary is not intended to identify key features or essential features of the claimed subject matter, nor is this summary intended as an aid in determining the scope of the claimed subject matter.

DETAILED DESCRIPTION

Figure 1:
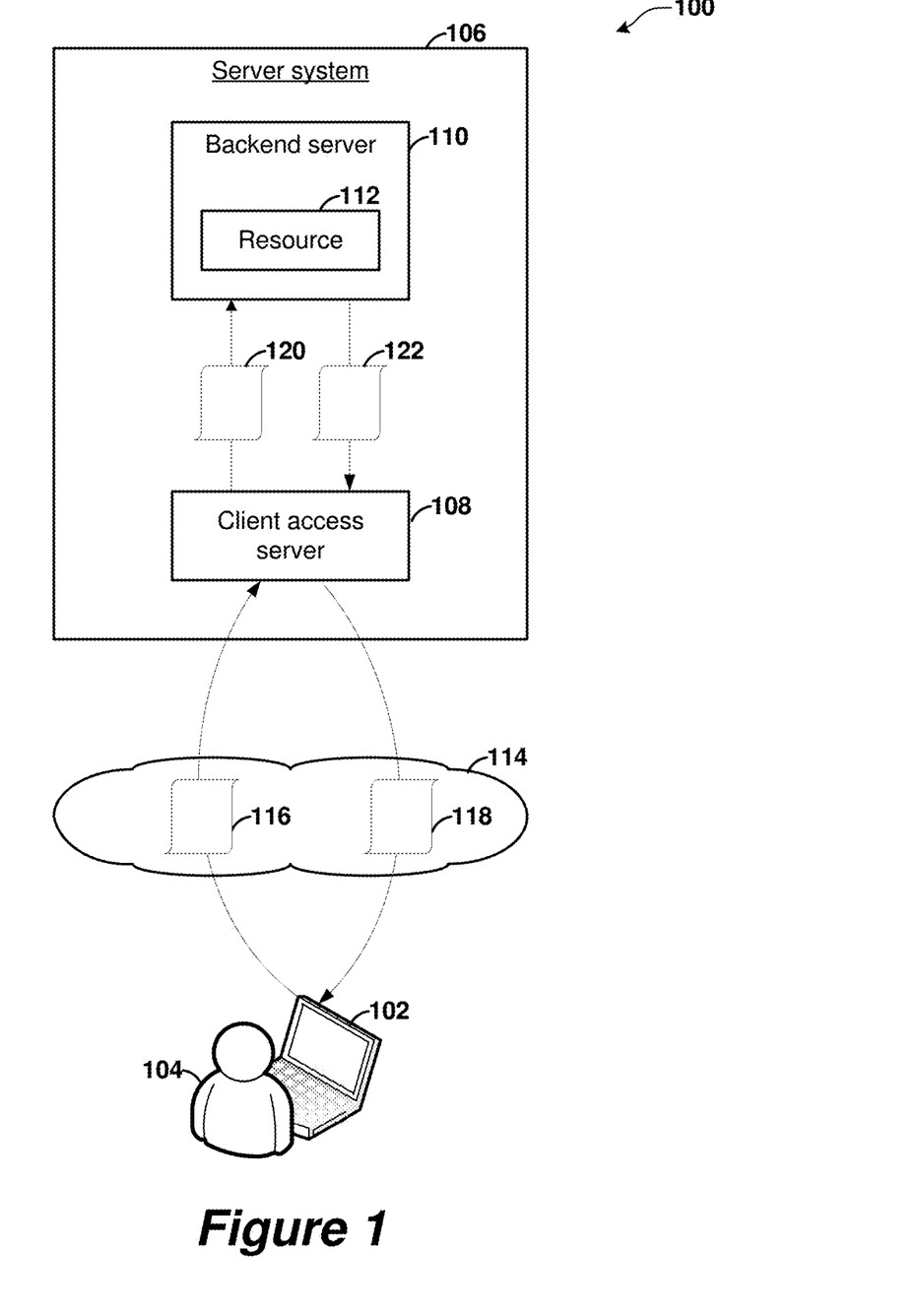
FIG. 1 is a block diagram illustrating an example resource access system.

FIG. 1 is a block diagram illustrating an example resource access system 100. The resource access system 100 enables direct or indirect access to resources. For example, the resource access system 100 can enable users to access an email service or a document management system.

As illustrated in the example of FIG. 1, the resource access system 100 comprises a computing device 102 used by a user 104. It should be appreciated that the resource access system 100 can comprise clients and users in addition to the computing device 102 and the user 104. Such clients and users are omitted from the example of FIG. 1 for the sake of clarity. Nevertheless, the omitted clients and users can behave in manners similar to that described herein with regard to the computing device 102 and the user 104.

In various embodiments, the computing device 102 can comprise one or more computing devices of various types. For example, the computing device 102 can comprise a personal computer, a laptop computer, a netbook computer, a handheld computer, a game console, a smart phone, a television set-top box, a network-enabled television, an in-car computer, or another type of computing device. In some embodiments, the computing device 102 comprises one or more computing devices of the type described below with regard to FIG. 7.

Furthermore, the resource access system 100 comprises a server system 106. The server system 106 comprises one or more computing devices. For example, the server system 106 can comprise one or more standalone server devices, blade server devices, personal computers, mainframe computers, data storage devices, routers, switches, firewall devices, intrusion detection devices, and/or other types of computing devices. In some embodiments, the server system 106 comprises one or more computing devices of the type described below with regard to FIG. 7.

The server system 106 comprises multiple servers. In the example of FIG. 1, the server system 106 provides a client access server (CAS) 108 and a backend server 110. In various embodiments, the server system 106 can provide the CAS 108 and the backend server 110 in various ways. For example, the CAS 108 can operate on one computing device in the server system 106 and the backend server 110 can operate on another computing device in the server system 106. In this example, the CAS 108 and the backend server 110 can exchange messages over a network. In another example, the CAS 108 and the backend server 110 are virtual servers operating on a single computing device in the server system 106. In some embodiments, the server system 106 can provide one or more backend servers and one or more client access servers in addition to the CAS 108 and the backend server 110. This patent document omits such additional client access servers and backend servers from the example of FIG. 1 for the sake of clarity.

The resource access system 100 also comprises a network 114 that facilitates communication between the computing device 102 and the client access server 108. The network 114 comprises one or more intermediate network devices. For example, the network 114 can comprise one or more switches, routers, hubs, bridges, server devices, firewall devices, and/or other types of intermediate network devices. Furthermore, the network 114 comprises one or more communication links that enable communication between computing devices in or attached to the network 114. The communication links can include wired and/or wireless communication links. Furthermore, the network 114 can be implemented in various ways. For example, the network 114 can be the Internet. In another example, the network 114 can be a wide area network, a real or virtual local area network, a personal area network, a virtual private network, or another type of network.

The backend server 110 provides access to a resource 112. In various embodiments, the resource 112 can be various types of resources. For example, the backend server 110 can be a hosted email service and the resource 112 can be an email mailbox that stores email messages associated with the user 104. In another example, the resource 112 can be a database. In yet another example, the resource 112 can be a directory. In yet another example, the resource 112 can be a web service. In yet another example, the resource 112 can be a multimedia stream. In yet another example, the resource 112 can be a processing unit in a computing device.

The user 104 interacts with the computing device 102 to perform some task. For example, the user 104 can interact with the computing device 102 to send and review email messages, create and check calendar appointments, create and review personal contacts, and so on. In another example, the user 104 can interact with the computing device 102 to create and retrieve stored documents. In yet another example, the user 104 can interact with the computing device 102 to play a game. In yet another example, the user 104 can interact with the computing device 102 to watch a video.

The user 104 is a client of the server system 106. As the user 104 interacts with the computing device 102, the computing device 102 sends to the CAS 108 primary requests associated with the user 104. The example of FIG. 1 illustrates that the computing device 102 sends a primary request 116 to the CAS 108. The primary request 116 is associated with the user 104. The primary request 116 is associated with the user 104 because the computing device 102 sends the primary request 116 to the CAS 108 as the user 104 interacts with the computing device 102. The computing device 102 can send the primary request 116 to the CAS 108 in direct or indirect response to input received from the user 104. For example, the computing device 102 can send the primary request 116 to the CAS 108 in response to the user 104 selecting a control in a user interface displayed by the computing device 102. In another example, the computing device 102 can send the primary request 116 to the CAS 108 as part of a background process.

In embodiments other than that illustrated in the example of FIG. 1, the CAS 108 receives primary requests associated with clients that are not individual users, such as the user 104. For instance, clients of the CAS 108 can include executing software components, groups of users, and so on. For example, an automated backup server can be a client of the server system 106. In this example, the automated backup server periodically sends primary requests to the CAS 108 to download data stored by the server system 106.

When the CAS 108 receives the primary request 116, the CAS 108 processes the primary request 116. In some instances, the CAS 108 generates a primary response 118 as a result of processing the primary request 116. The primary response 118 is a response to the primary request 116. The CAS 108 sends the primary response 118 to the computing device 102 via the network 114.

Processing the primary request 116 can entail sending a secondary request 120 to the backend server 110. The backend server 110 accesses the resource 112 as part of processing the secondary request 120. The backend server 110 can then send a secondary response 122 back to the CAS 108. The secondary response 122 is a response to the secondary request 120. For example, the resource 112 can be an email mailbox. In this example, the primary request 116 can comprise a request to retrieve a list of email messages in the email mailbox. In this example, the CAS 108 sends the secondary request 120 to the backend server 110 as part of processing the primary request 116. In this example, the backend server 110 accesses the email mailbox and sends the secondary response 122 back to the CAS 108. In this example, the secondary response 122 comprises data representing the list of email messages.

In some circumstances, the CAS 108 waits for the expiration of a delay period before sending the secondary request to the backend server 110. The duration of the delay period depends at least on part on the recent latency level for the user 104 with regard to the resource 112. A recent latency level of a client with regard to a given resource is the sum of the latencies of the client's recent secondary requests for the given resource minus the client's aged latency for the given resource. A client's secondary requests (i.e., secondary requests associated with a client) are requests that are initiated by the CAS 108 in response to primary requests associated with the client. A secondary request involves a given resource when the backend server 110 accesses the given resource to process the secondary request. The client's recent secondary requests involving the given resource are those ones of the client's secondary requests involving the given resource that have starting or ending times within a rolling time window. The client's aged latency for the given resource is equal to the sum of aged portions of the client's recent secondary requests for the given resource. The aged portion of a secondary request is the amount of time between a start time of the secondary request and the trailing edge of the rolling time window.

Figure 2:
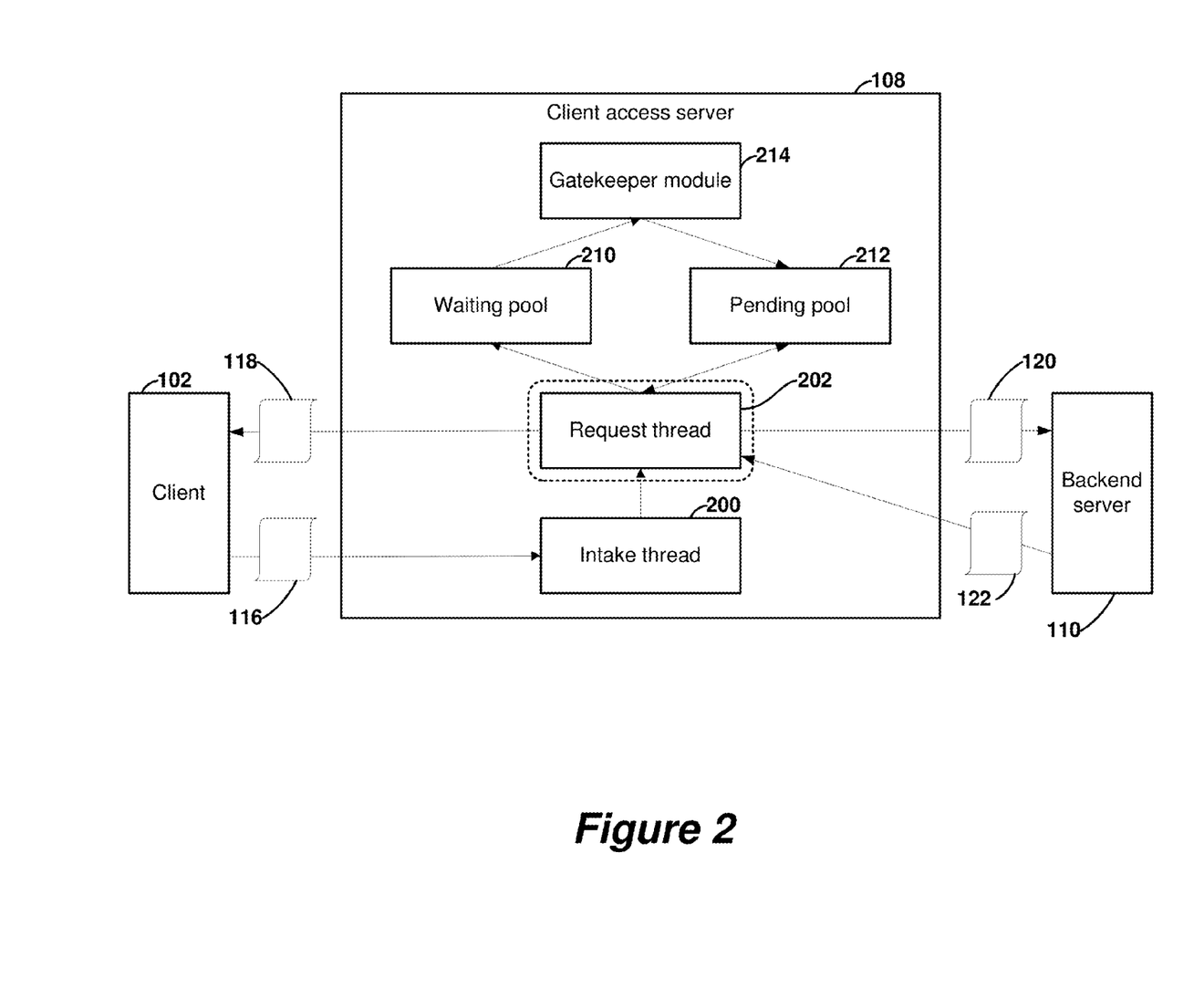
FIG. 2 is a block diagram illustrating example details of a client access server.

FIG. 2 is a block diagram illustrating example details of the CAS 108. As illustrated in the example of FIG. 2, the CAS 108 comprises an intake thread 200. When the computing device 102 sends the primary request 116 to the CAS 108, the intake thread 200 starts a request thread 202 to process the primary request 116. In various embodiments, the intake thread 200 can start the request thread 202 in various ways. For example, the intake thread 200 can maintain a pool of available request threads. Each of the available request threads in the pool has previously been instantiated. In this example, the intake thread 200 can start the request thread 202 by selecting the request thread 202 from among the available request threads in the pool. In another example, the intake thread 200 can instantiate and start the request thread 202. Furthermore, in some embodiments, request threads such as the request thread 202 can start other request threads.

The request thread 202 performs an operation that processes the primary request 116 in order to generate the primary response 118. The request thread 202 sends the secondary request 120 to the backend server 110 as part of performing the operation to process the primary request 116. For example, the resource 112 can be a mailbox containing an email message. In this example, the primary request 116 may comprise a request for a copy of the email message. In this example, the request thread 202 can send the secondary request 120 to the backend server 110 in order to retrieve a copy of the email message from the mailbox (i.e., the resource 112). When the backend server 110 finishes processing the secondary request 120, the backend server 110 sends the secondary response 122 back to the request thread 202 as a response to the primary request 116.

There can be multiple secondary requests involving the resource 112 concurrently pending at the backend server 110. For example, the intake thread 200 can receive other primary requests associated with the user 104 or another client before the request thread 202 finishes processing the primary request 116. Therefore, the intake thread 200 can start one or more request threads in addition to the request thread 202. These additional request threads can run concurrently. These additional request threads can generate secondary requests involving the resource 112. Because multiple request threads can generate secondary requests involving the resource 112, a request thread can send a secondary request involving the resource 112 before the backend server 110 finishes processing another secondary request involving the resource 112. In this way, there can be multiple secondary requests involving the resource 112 pending at the backend server 110 concurrently.

In some instances, the backend server 110 does not allow concurrent access to the resource 112. For example, the backend server 110 can start a separate thread for each received secondary request involving the resource 112. In this example, the threads may not be able to concurrently access the resource 112. Consequently, the backend server 110 can suspend processing a first secondary request involving the resource 112 while continuing to process a second secondary request involving the resource 112. Suspending processing of the first secondary request can increase the latency of the first secondary request. If the CAS 108 sends a sufficiently large number of secondary requests involving the resource 112 associated with the user 104 within a given time window, the backend server 110 can process the secondary requests associated with the user 104 without processing other clients' secondary requests involving the resource 112. As a result, the latencies of the other clients' secondary requests involving the resource 112 can increase to unacceptable levels.

To help prevent the latencies of the other clients' secondary requests involving the resource 112 from increasing to unacceptable levels, the request thread 202 determines whether the average latency level of the resource 112 is greater than a healthy latency level for the resource 112. If the average latency level of the resource 112 is greater than the healthy latency level for the resource 112, the request thread 202 waits for the expiration of a delay period prior to sending the secondary request 120. The average latency level of the resource 112 is the average latency of secondary requests involving the resource 112. In some instances, the secondary requests involving the resource 112 can be associated with multiple clients. If the CAS 108 has received a response for a secondary request, the latency of the secondary request is the amount of time that passed between the start time of the secondary request and the end time of the secondary request. The start time of the secondary request is the time at which the CAS 108 sent the secondary request to the backend server 110. The end time of the secondary request is the time at which the CAS 108 received a resource response for the secondary request. If the CAS 108 has not yet received a response for a secondary request, the latency of the secondary request is the amount of time that has passed after the CAS 108 sent the secondary request to the backend server 110.

Because the request thread 202 waits to send the secondary request 120, the backend server 110 has the opportunity to process the other clients' secondary requests involving the resource 112. Because the backend server 110 has the opportunity to process the other clients' secondary requests involving the resource 112, the average latency of all secondary requests involving the resource 112 can decrease.

The duration of the delay period depends in part on the recent latency level of the user 104 with regard to the resource 112. If the user 104 is heavily using a resource, the recent latency level of the user 104 with regard to the resource 112 increases. Consequently, the duration of the delay period can increase as the recent latency of the user 104 with regard to the resource 112 increases. Advantageously, such delays can help to stymie denial of service (DoS) attacks. When clients participating in the DoS attack (i.e., illegitimate clients) flood the CAS 108 with primary requests, the CAS 108 increasingly delays the illegitimate clients' requests to access the resource 112. Because the CAS 108 delays the illegitimate clients' requests to access the resource 112, clients that make sporadic use of the resource 112 (i.e., legitimate clients) can continue to access the resource 112, thus defeating a purpose of running of the DoS attack.

Furthermore, if the backend server 110 has too many concurrently pending secondary requests, the backend server 110 may not be able to efficiently process the secondary requests. For example, when the backend server 110 receives a second request involving a resource, the backend server 110 devotes some processing resources (e.g., RAM, processor time, etc.) to processing the secondary request. In this example, as number of concurrently pending secondary requests at the backend server 110 increases, the amount of processing resources that the backend server 110 can devote to individual secondary requests decreases. Eventually, in this example, the amount of processing resources that the backend server 110 can devote to individual secondary requests decreases to the point where the latencies of the secondary requests start to increase. Ultimately, the latencies of the secondary requests can increase to an unacceptable level. In essence, the backend server 110 can become overwhelmed by too many concurrently pending secondary requests.

To reduce the chances of backend server 110 becoming overwhelmed by too many concurrently pending secondary requests, the CAS 108 maintains a waiting pool 210, a pending pool 212, and a gatekeeper module 214. The waiting pool 210 comprises one or more data structures that store zero or more thread references. The thread references comprise data structures that identify request threads that are waiting to send secondary requests to the backend server 110. In some embodiments, the waiting pool 210 is implemented as a queue of thread references. The gatekeeper module 214 is responsible for removing thread references in the waiting pool 210.

The pending pool 212 comprises one or more data structures that represent a set of slots. The number of slots in the pending pool 212 is equal to a maximum pending request count. The maximum pending request count indicates a maximum number of secondary requests that are allowed to be pending at the backend server 110 concurrently. The gatekeeper module 214 dynamically adjusts the maximum pending request count based on an average latency level of the backend server 110, and thus the number of slots in the pending pool 212. In some embodiments, the pending pool 212 is implemented as a semaphore.

The request thread 202 is only able to send the secondary request 120 to the backend server 110 if the request thread 202 holds one of the slots in the pending pool 212. Hence, when the request thread 202 is ready to send the secondary request 120, the request thread 202 determines whether there is an available slot in the pending pool 212. There is an available slot in the pending pool 212 if a current pending request count is less than the maximum pending request count. The current pending request count indicates how many secondary requests are currently pending at the backend server 110.

If there is an available slot in the pending pool 212, the request thread 202 takes the available slot and sends the secondary request 120 to the backend server 110. As a result, the current pending request count increases by one. After the request thread 202 receives the secondary response 122 from the backend server 110, the request thread 202 releases the slot in the pending pool 212. As a result, the current pending request count decreases by one.

If there are no available slots in the pending pool 212, the request thread 202 adds a thread reference to the waiting pool 210 and sleeps. The thread reference identifies the request thread 202. As slots in the pending pool 212 become available (i.e., as the current pending request count drops below the maximum pending request count), the gatekeeper module 214 removes the thread reference from the waiting pool 210 and wakes the request thread 202. Upon waking, the request thread 202 takes an available slot in the pending pool 212, sends the secondary request 120 to the backend server 110, receives the secondary response 122 from the backend server 110, and releases the slot in the pending pool 212. In this way, the CAS 108 limits the maximum number of secondary requests that can be concurrently pending at the backend server 110.

In various embodiments, the intake thread 200, the request thread 202, and the gatekeeper module 214 can be implemented in various ways. For example, in some embodiments, one or more computer storage media store instructions that, when executed by one or more processing units in the server system 106, cause the CAS 108 to provide the functionality of the intake thread 200, the request thread 202, and the gatekeeper module 214.

Figure 3:
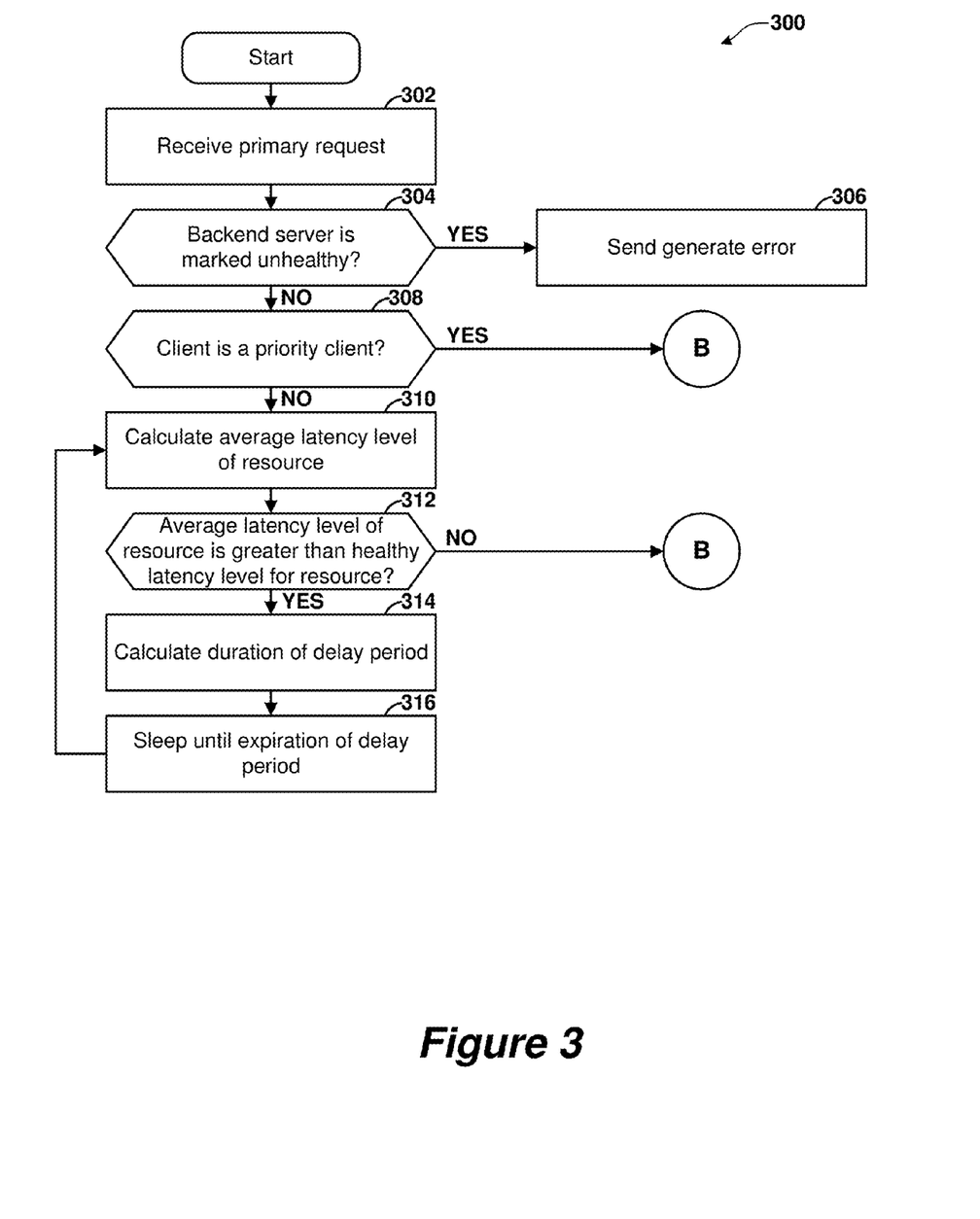
FIG. 3 is a flowchart illustrating a first part of an example operation performed by a request thread.

FIG. 3 is a flowchart illustrating a first part of an example operation 300 of the request thread 202. The request thread 202 performs the operation 300 as part of an operation to process the primary request 116. It should be appreciated that the request thread 202 can perform steps in addition to those of the operation 300 when processing the primary request 116.

As illustrated in the example of FIG. 3, the operation 300 begins when the request thread 202 receives the primary request 116 sent by the computing device 102 (302). The primary request 116 is associated with the user 104. In response to receiving the primary request 116, the request thread 202 determines whether the gatekeeper module 214 has marked the backend server 110 as unhealthy (304). As described elsewhere in this patent document, the gatekeeper module 214 marks the backend server 110 as unhealthy when one or more request threads have been in the waiting pool 210 for longer than a timeout limit. The gatekeeper module 214 marks the backend server 110 as unhealthy under these circumstances because a request thread is only likely to stay in the waiting pool 210 for longer than the timeout period if the backend server 110 has been unresponsive to a significant number of secondary requests for a significant amount of time.

If the gatekeeper module 214 has marked the backend server 110 as unhealthy ("YES" of 304), the request thread 202 generates an error (306). For example, the request thread 202 can send an error message to the computing device 102 indicating that the server system 106 was unable to process the primary request 116. The operation 300 terminates after the request thread 202 generates the error. In this way, the CAS 108 does not send an additional secondary request to an unresponsive backend server. Furthermore, by terminating the request thread 202 after generating the error, the intake thread 200 is free to reuse the request thread 202 sooner than if the intake thread 200 had to wait for a secondary request from the request thread 202 to time out before the intake thread 200 was able to reuse the request thread 202.

On the other hand, if the gatekeeper module 214 has not marked the backend server 110 as unhealthy ("NO" of 304), the request thread 202 determines whether the computing device 102 is a priority client (308). In some circumstances, it can be important for a client to be able to access a resource with a minimum amount of delay. For example, a company can provide email access to its employees through an email web service, such as MICROSOFT® OUTLOOK® Web App, and through individual thick-client email applications, such as MICROSOFT® OUTLOOK® clients. To help ensure that the email web service is responsive to the demands of multiple employees, it may be important for the email web service to be able to access mailboxes hosted by the backend server 110 quickly. Consequently, in this example, an administrator for the company can designate the email web service as a priority client, but does not designate the thick-client email applications as priority clients. If the computing device 102 is a priority client ("YES" of 308), the request thread 202 performs the part of the operation 300 illustrated in FIG. 4, thereby skipping the portion of the operation 300 that can cause the request thread 202 to sleep until the expiration of a delay period before attempting to send the secondary request 120 to the backend server 110. In this way, the request thread 202 sends the secondary request 120 without waiting for the delay period to expire when the user 104 is a priority client.

Otherwise, if the computing device 102 is not a priority client ("NO" of 308), the request thread 202 calculates the average latency level of the resource 112 (310). As discussed above, the average latency level of the resource 112 is an average of the latencies of secondary requests involving the resource 112. The secondary requests can be associated with multiple clients. In various embodiments, the request thread 202 calculates the average latency level of the resource 112 in various ways. For example, the request thread 202 can calculate the average latency level of the resource 112 by dividing a sum of the latencies of secondary requests involving the resource 112 by the total number of secondary requests involving the resource 112. In another example, the request thread 202 can calculate the average latency level of the resource 112 using a moving weighted average of the latencies of the secondary requests involving the resource 112 in which older latencies are less significant and newer latencies are more significant.

The request thread 202 then determines whether the average latency level of the resource 112 is greater than the healthy latency level of the resource 112 (312). There can be different healthy latency levels for different resources. An administrator or programmer can establish the healthy latency level for a resource based on observed latencies of requests involving the resource. For example, the healthy latency level of a resource can be established based on the observed latencies of requests involving the resource when the backend server 110 is processing the requests at a maximum throughput. If the average latency level of the resource 112 is not greater than the healthy latency level for the resource 112 ("NO" of 312), the request thread 202 performs the part of the operation 300 illustrated in FIG. 4.

Otherwise, if the average latency level of the resource 112 is greater than the healthy latency level for the resource 112 ("YES" of 312), the request thread 202 calculates a duration of a delay period (314). In some embodiments, the duration of the delay period depends on the recent latency level of the user 104 regarding the resource 112, the average latency level of the resource 112, and the healthy latency level of the resource 112. For example, the duration of the delay period can be equal to W*(AL/HL). In this formula, W represents the recent latency level of the user 104 with regard to the resource 112, AL represents the average latency level of the resource 112, and HL represents the healthy latency level of the resource 112, and (AL/HL) is the quotient of AL divided by HL. As discussed above, the recent latency level of the user 104 with regard to the resource 112 is the sum of the latencies of the recent secondary requests associated with the user 104 involving the resource 112 minus the aged latency of the user 104 for the resource 112.

Furthermore, in some embodiments, the user 104 (i.e., the client) is a member of a group that includes multiple clients. For example, the user 104 can be a member of an engineering department of a company. In this example, the duration of the delay period can depend on recent latency levels of other members of the group with regard to the resource 112. In this example, the duration of the delay period can be equal to G*(AL/HL). In this formula, G can represent a recent latency of the group with regard to the resource 112. In various embodiments, G can be calculated in various ways. For example, G can be an average (e.g., mean or median) of the group members' recent latency levels regarding the resource. In this way, the CAS 108 may be able to prevent the members of the group from monopolizing the resource 112.

After calculating the duration of the delay period, the request thread 202 sleeps until the expiration of the delay period (316). In other words, the request thread 202 sleeps for an amount of time equal to the duration of the delay period. For example, if the duration of the delay period is six seconds, the request thread 202 sleeps for six seconds. After the delay period expires, the request thread 202 again calculates the average latency level of the resource 112 (310). The request thread 202 continues looping through steps 310-316 in this manner until the average latency level of the resource 112 is less than the healthy latency level of the resource 112.

Figure 4:
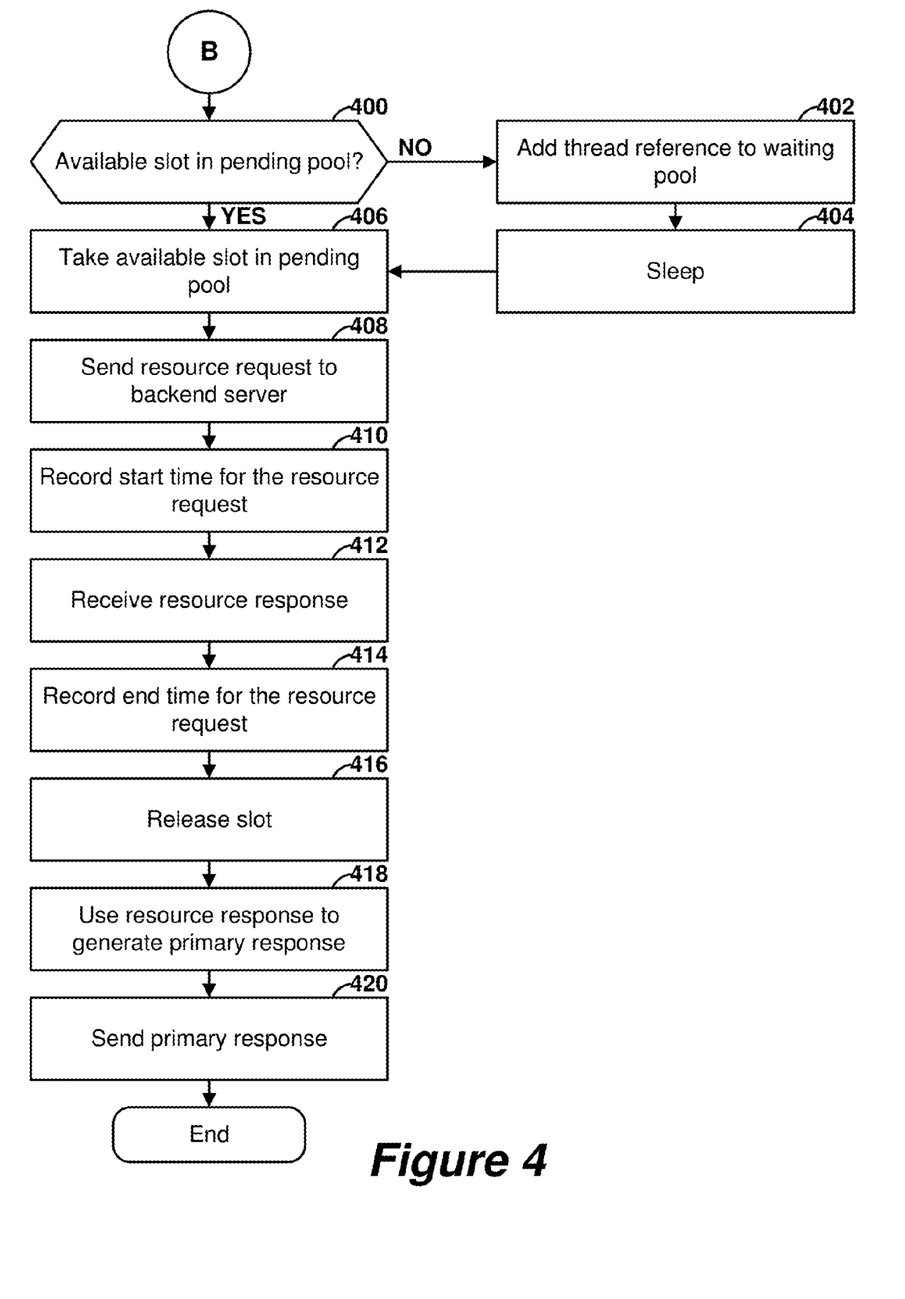
FIG. 4 is a flowchart illustrating a second part of the example operation performed by the request thread.

FIG. 4 is a flowchart illustrating a second part of the example operation 300 performed by the request thread 202. After determining that the user 104 is a priority client ("YES" of 308) or after determining that the average latency level of the resource 112 is not greater than the healthy latency level for the resource 112 ("NO" of 312), the request thread 202 determines whether there is an available slot in the pending pool 212 (400). In various embodiments, the request thread 202 can determine whether there is an available slot in the pending pool 212 in various ways. For example, the request thread 202 can determine whether the current pending request count is less than the maximum pending request count.

If there are no available slots in the pending pool 212 ("NO" of 400), the request thread 202 adds a thread reference to the waiting pool 210 (402). The thread reference is a data structure that identifies the request thread 202. As used in this patent document, a request thread is said to be in the waiting pool 210 if the waiting pool 210 contains a thread reference that identifies the request thread 202. After adding the thread reference to the waiting pool 210, the request thread 202 sleeps (404). As described below with reference to FIG. 5, the request thread 202 sleeps until the gatekeeper module 214 removes the request thread 202 from the waiting pool 210 (i.e., removes a thread reference identifying the request thread 202 from the waiting pool 210) or until the request thread 202 is otherwise terminated. The gatekeeper module 214 removes request threads from the waiting pool 210 when there are available slots in the pending pool 212. For instance, the gatekeeper module 214 can remove request threads from the waiting pool 210 when the current pending request count for the backend server 110 falls below the maximum pending request count for the backend server 110. In this way, the request thread 202 waits to send the secondary request 120 until the current pending request count for the backend server 110 is less than the maximum pending request count for the backend server 110.

If there is an available slot in the pending pool 212 ("YES" of 400) or after the request thread 202 wakes in step 404, the request thread 202 takes the available slot in the pending pool 212 (406). In various embodiments, the request thread 202 can take the available slot in various ways. For example, the request thread 202 can take the available slot by adding a thread reference to the pending pool 212. In another example, the pending pool 212 comprises a current pending request count that indicates how many secondary requests are currently pending at the backend server 110. In this example, the request thread 202 can increment the current pending request count.

After taking the available slot in the pending pool 212, the request thread 202 sends the secondary request 120 to the backend server 110 (408). When the request thread 202 sends the secondary request 120 to the backend server 110, the request thread 202 records a start time for the secondary request 120 (410). The start time for the secondary request 120 indicates the time at which the request thread 202 sent the secondary request 120 to the backend server 110.

Subsequently, the request thread 202 waits until the request thread 202 receives the secondary response 122 from the backend server 110 (412). When the request thread 202 receives the secondary response 122 from the backend server 110, the request thread 202 records the end time for the secondary request 120 (414). The end time for the secondary request 120 indicates the time at which the request thread 202 received the secondary response 122. The difference between the start time for the secondary request 120 and the end time for the secondary request 120 is the latency for the secondary request 120.

The request thread 202 then releases the slot in the pending pool 212 (416). In this way, the request thread 202 makes the slot available for another request thread. In various embodiments, the request thread 202 can release the slot in various ways. For example, the request thread 202 can remove a thread reference identifying the request thread 202 from the pending pool 212. In another example, the request thread 202 can decrement a current pending request count.

After releasing the slot in the pending pool 212, the request thread 202 uses data in the secondary response 122 to generate the primary response 118 (418). In various embodiments, the request thread 202 uses data in the secondary response 122 to generate the primary response 118 in various ways. For example, the primary request 116 can comprise a request for a list of email messages and the resource 112 can comprise an email box. In this example, the secondary response 122 can comprise data representing the list of email messages. Furthermore, in this example, the request thread 202 can format the data in the secondary response 122 into a format understood by the computing device 102 and include the formatted data in the primary response 118.

After generating the primary response 118, the request thread 202 sends the primary response 118 to the computing device 102 (420). The operation 300 ends after the request thread 202 sends the primary response 118 to the computing device 102.

Figure 5:
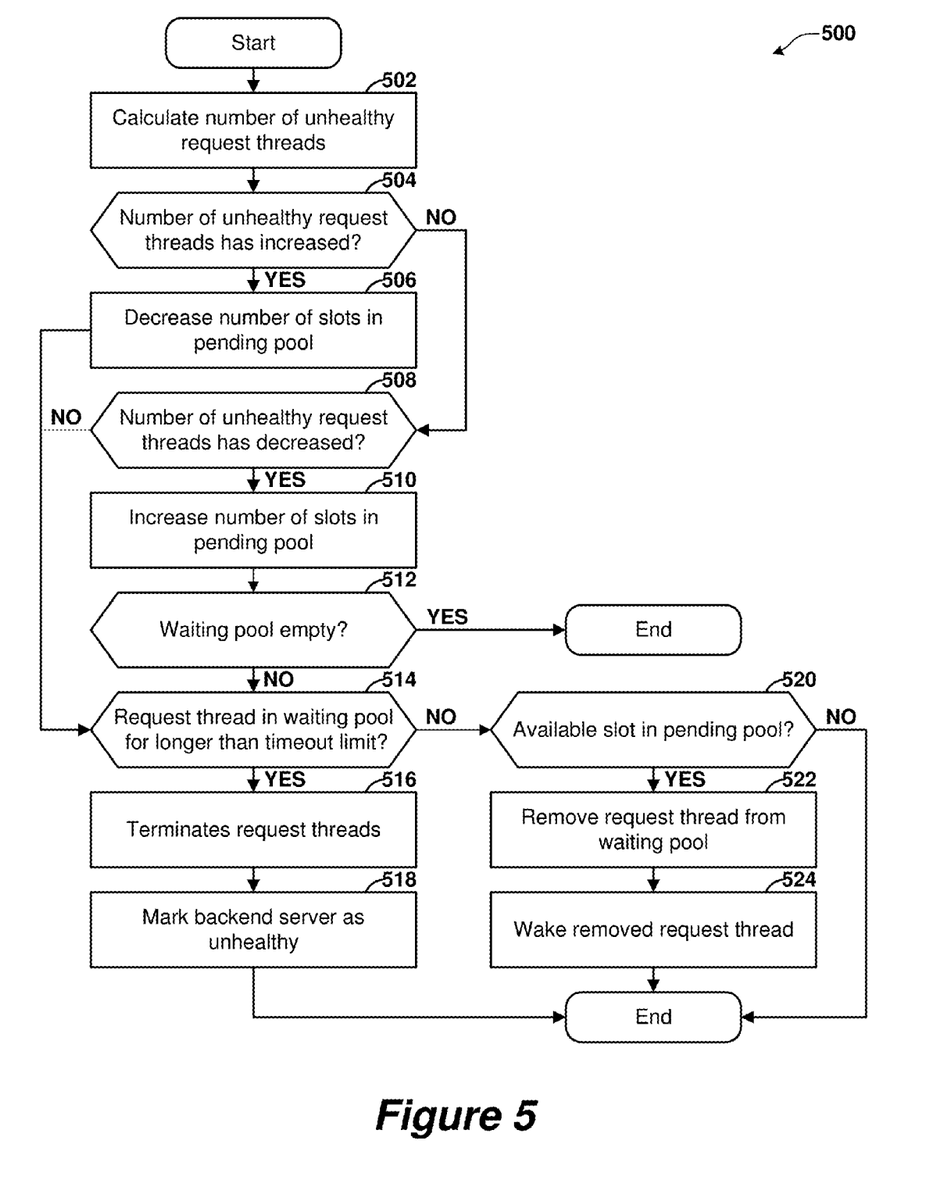
FIG. 5 is a flowchart illustrating an example operation performed by a gatekeeper module.

FIG. 5 is a flowchart illustrating an example operation 500 performed by the gatekeeper module 214. As illustrated in the example of FIG. 5, the gatekeeper module 214 first calculates a number of unhealthy request threads currently in the pending pool 212 (502). The unhealthy request threads are request threads that have been in the pending pool 212 for longer than a healthy time limit. In other words, an unhealthy request thread has a secondary request pending at the backend server 110 for longer than the healthy time limit. In various embodiments, the healthy time limit can have various durations. For example, in some embodiments, the healthy time limit can be 200 ms. In other embodiments, the healthy time limit can have longer or shorter durations.

The gatekeeper module 214 then determines whether the number of unhealthy request threads currently in the pending pool 212 has increased since a previous time the gatekeeper module 214 calculated the number of unhealthy request threads in the pending pool 212 (504). If the number of unhealthy request threads currently in the pending pool 212 has increased ("YES" of 504), the gatekeeper module 214 decreases the number of slots in the pending pool 212 (506). In other words, the gatekeeper module 214 decreases the maximum pending request count. In this way, the gatekeeper module 214 decreases the maximum number of secondary requests that can be pending at the backend server 110 at any given time. Decreasing the maximum number of secondary requests pending at the backend server 110 can give the backend server 110 the opportunity to devote processing resources to finishing the pending secondary requests instead of further dividing such processing resources among new secondary requests.

On the other hand, if the number of unhealthy request threads in the pending pool 212 has not increased ("NO" of 504), the gatekeeper module 214 determines whether the number of unhealthy request threads in the pending pool 212 has decreased since the previous time the gatekeeper module 214 calculated the number of unhealthy request threads in the pending pool 212 (508). If the number of unhealthy request threads in the pending pool 212 has decreased ("YES" of 508), the gatekeeper module 214 increases the number of slots in the pending pool 212 (510). In other words, the gatekeeper module 214 increases the maximum pending request count. Because an unhealthy request thread is no longer using resources of the backend server 110, the backend server 110 may be able to handle more pending secondary requests. By increasing the number of slots in the pending pool 212, more pending secondary requests can be pending at the backend server 110 at a given time.

After decreasing the number of slots in the pending pool 212 in step 506, increasing the number of slots in the pending pool 212 in step 510, or determining that the number of unhealthy request threads has not decreased ("NO" of 508), the gatekeeper module 214 determines whether the waiting pool 210 is empty (512). In other words, the gatekeeper module 214 determines whether the waiting pool 210 contains any request threads. If the waiting pool 210 is empty ("YES" of 512), the operation 500 ends.

However, if the waiting pool 210 is not empty ("NO" of 512), the gatekeeper module 214 determines whether any request thread has been in the waiting pool 210 for longer than a timeout limit (514). In various embodiments, the timeout limit can be various lengths of time. For example, the timeout limit can be five minutes, seven minutes, nine minutes, or another length of time.

If a request thread has been in the waiting pool 210 for longer than the timeout limit ("YES" of 514), the gatekeeper module 214 terminates request threads in the waiting pool 210 (516). In various embodiments, a request thread can perform various actions when the gatekeeper module 214 terminates the request thread. For example, the request thread can generate an exception and return to a pool of available request threads. In another example, the request thread can send an error response message to a client and terminate.

As discussed above, the server system 106 can include multiple backend servers. These other backend servers may still be able to process to secondary requests. In these circumstances, it is desirable for the CAS 108 to be able to send secondary requests to these other backend servers. However, in some embodiments, the CAS 108 is only able to create a limited number of request threads. If the gatekeeper module 214 did not the terminate the request threads in the waiting pool 210 when a request thread has been in the waiting pool 210 for more than the timeout limit, the request threads in the waiting pool 210 would be unavailable for use by the CAS 108 to send secondary requests to the other backend servers. Terminating these request threads in the waiting pool 210 frees up these request threads for use in sending secondary requests to the other backend servers.

After terminating the request threads in the waiting pool 210, the gatekeeper module 214 marks the backend server 110 as unhealthy (518). Marking the backend server 110 as unhealthy effectively prevents new request threads from attempting to send secondary requests to the backend server 110. The operation 500 ends after the gatekeeper module 214 marks the backend server 110 as unhealthy.

On the other hand, if no request thread has been in the waiting pool 210 for longer than the timeout limit ("NO" of 514), the gatekeeper module 214 determines whether there is an available slot in the pending pool 212 (520). If there is no available slot in the pending pool 212 ("NO" of 520), the operation 500 ends. However, if there is an available slot in the pending pool 212 ("YES" of 520), the gatekeeper module 214 removes a request thread from the waiting pool 210 (522). In various embodiments, the gatekeeper module 214 selects request threads to remove from the waiting pool 210 in various ways. In some embodiments, the gatekeeper module 214 removes a request thread that has been in the waiting pool 210 for a longer amount of time than any other request thread in the waiting pool 210. In other embodiments, the gatekeeper module 214 selects and removes some request threads, such as those associated with priority clients, from the waiting pool 210 ahead of request threads that may have been in the waiting pool 210 longer.

In yet another example of how the gatekeeper module 214 can remove a request thread from the waiting pool 210, the gatekeeper module 214 determines whether there are multiple secondary requests in the waiting pool 210. In this example, if there are multiple secondary requests in the waiting pool 210, the gatekeeper module 214 selects request threads in the waiting pool 210 based on relative health levels of the resources involved in the secondary requests to be sent by the request threads in the waiting pool 210. As used in this patent document, the health level of a resource can be an amount by which the healthy latency level of the resource exceeds the average latency level of the resource. In this example, the gatekeeper module 214 can select request threads that will send secondary request involving resources with higher health levels before selecting request threads that will send secondary requests involving resources with lower health levels.

After selecting and removing a given request thread from the waiting pool 210, the gatekeeper module 214 wakes the given request thread (524). For example, if the given request thread was the request thread 202, the gatekeeper module 214 wakes the request thread 202. Upon waking, the given request thread can resume the operation 300 at step 406. After the gatekeeper module 214 wakes the given request thread, the operation 500 ends.

In various embodiments, the gatekeeper module 214 performs the operation 500 in response to various events. For example, the gatekeeper module 214 can perform the operation 500 on a periodic basis, such as once every ten seconds. In another example, the gatekeeper module 214 can perform the operation 500 on a continual basis. That is, in this example, the gatekeeper module 214 can start the operation 500 as soon as the operation 500 ends. In yet another example, the gatekeeper module 214 can perform the operation 500 in response to an external event, such as a method invocation or the receipt of a secondary response.

Moreover, this patent document explains the operation 500 with reference to the backend server 110. However, some embodiments of the server system 106 include backend servers in addition to the backend server 110. In such embodiments, the CAS 108 includes additional waiting pools and pending pools for each of the additional backend servers. Furthermore, in such embodiments, the gatekeeper module 214 uses the additional waiting pools and pending pools associated with the additional backend servers to separately perform the operation 500 with regard to the additional backend servers in the server system 106.

Figure 6:
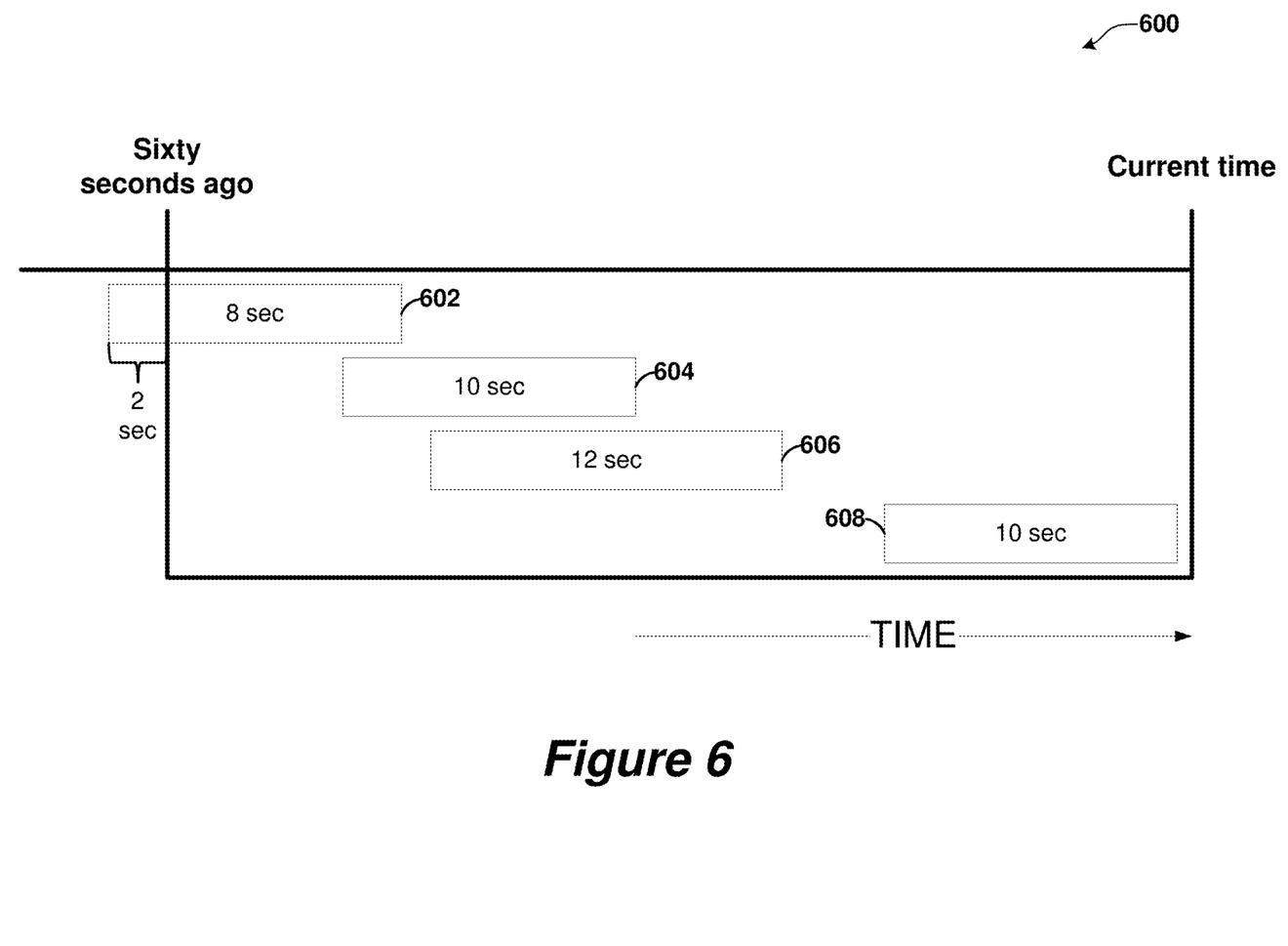
FIG. 6 is a diagram illustrating an example visualization of a recent latency level of a client with regard to a resource.

FIG. 6 is a diagram illustrating an example visualization of a recent latency level of a client with regard to the resource 112. As illustrated in the example of FIG. 6, a timeline 600 starts at sixty seconds ago and ends with the current time. Blocks 602, 604, 606, and 608 are displayed on the timeline 600. Each of the blocks 602, 604, 606, and 608 are associated with a different secondary request sent by the CAS 108 to access the resource 112 in the course of processing one or more primary requests from the computing device 102.

The left edges of the blocks 602, 604, 606, and 608 represent the start times for the associated secondary requests. In other words, the left edges of the blocks 602, 604, 606, and 608 represent the times at which the CAS 108 sent the associated secondary requests to the backend server 110. The right edges of the blocks 602, 604, 606, and 608 represent the end times for the associated secondary requests. In other words, the right edges of the blocks 602, 604, 606, and 608 represent the times at which the CAS 108 received resource responses for the associated secondary requests.

As illustrated in the example of FIG. 6, each of the blocks 602, 604, 606, and 608 specifies the latencies of the associated secondary requests. In other words, each of the blocks 602, 604, 606, and 608 specifies an amount of time between the start times of the associated secondary requests and the end times of the associated secondary requests. In the example of FIG. 6, the block 602 is associated with a secondary request that had a latency of eight seconds. The left edge of the block 602 represents sixty-two seconds before the current time and the right edge of the block 602 represent fifty-two seconds before the current time. The block 604 is associated with a secondary request that had a latency of ten seconds. The block 606 is associated with a secondary request that had a latency of twelve seconds. The block 608 is associated with a secondary request that had a latency of twelve seconds.

As discussed above, a client's recent latency level for a given resource is the sum of the latencies of the client's recent secondary requests involving the given resource minus the client's aged latency for the given resource. The client's aged latency for the given resource is equal to the sum of aged portions of the client's recent secondary requests involving the given resource. The aged portion of a secondary request is the amount of time between a start time of the secondary request and the trailing edge of the rolling time window.

If the rolling time window used by the CAS 108 is sixty seconds, the secondary requests associated with the blocks 602, 604, 606, and 608 are the client's recent secondary requests involving the resource 112. The sum of the latencies of the client's recent secondary requests involving the resource 112 is 40 (i.e., 8+10+12+10). There are two seconds that follow start times of the client's recent secondary requests involving the resource 112 but precede the trailing edge of the rolling time window. In other words the client's aged latency for the resource 112 is two seconds. Hence, the client's recent latency level for the resource 112 is equal to 38 (i.e., 40−2).

Figure 7:
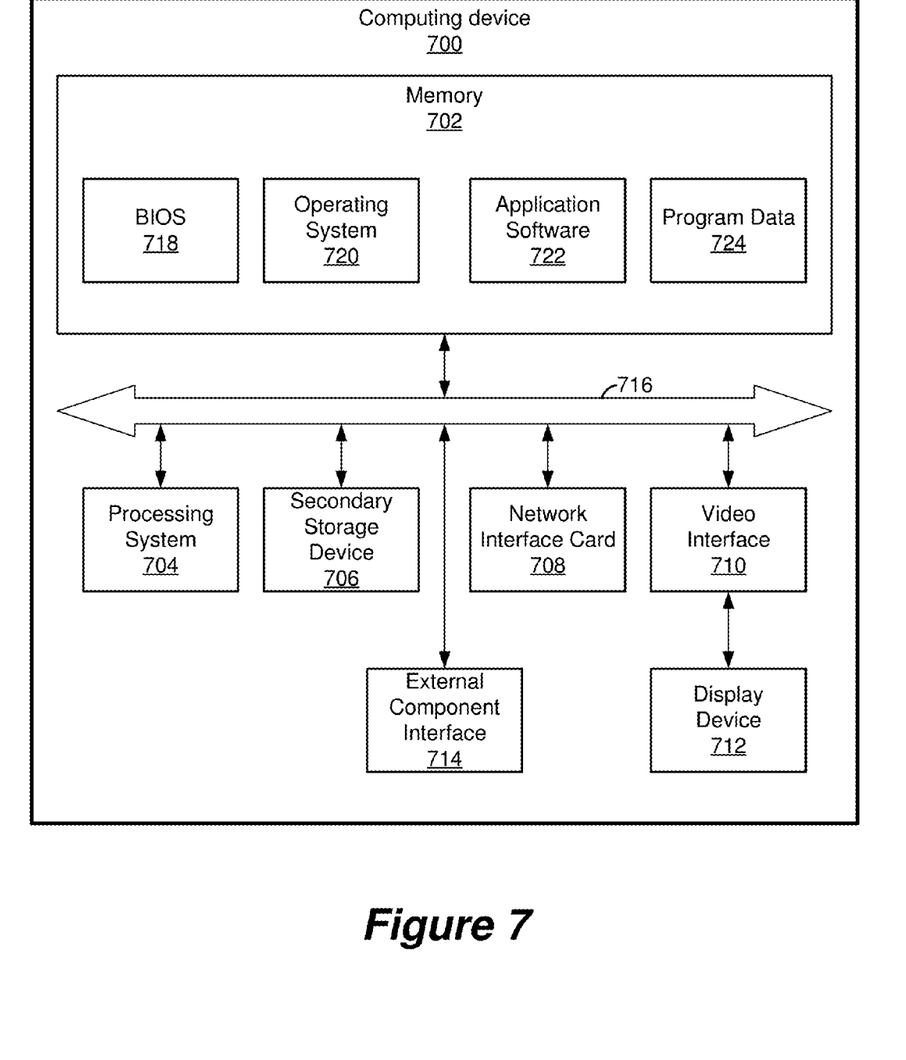
FIG. 7 is a block diagram illustrating an example computing device.

FIG. 7 is a block diagram illustrating an example computing device 700. In some embodiments, the computing device 102 and the server system 106 are implemented using one or more computing devices like the computing device 700. It should be appreciated that in other embodiments, the computing device 102 and/or the server system 106 are implemented using computing devices having hardware components other than those illustrated in the example of FIG. 7.

The term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

In the example of FIG. 7, the computing device 700 comprises a memory 702, a processing system 704, a secondary storage device 706, a network interface card 708, a video interface 710, a display unit 712, an external component interface 714, and a communication medium 716. The memory 702 includes one or more computer storage media capable of storing data and/or instructions. In different embodiments, the memory 702 is implemented in different ways. For example, the memory 702 can be implemented using various types of computer storage media.

The processing system 704 includes one or more processing units. A processing unit is a physical device or article of manufacture comprising one or more integrated circuits that selectively execute software instructions. In various embodiments, the processing system 704 is implemented in various ways. For example, the processing system 704 can be implemented as one or more processing cores. In another example, the processing system 704 can comprise one or more separate microprocessors. In yet another example embodiment, the processing system 704 can comprise an application-specific integrated circuit (ASIC) that provides specific functionality. In yet another example, the processing system 704 provides specific functionality by using an ASIC and by executing computer-executable instructions.

The secondary storage device 706 includes one or more computer storage media. The secondary storage device 706 stores data and software instructions not directly accessible by the processing system 704. In other words, the processing system 704 performs an I/O operation to retrieve data and/or software instructions from the secondary storage device 706. In various embodiments, the secondary storage device 706 comprises various types of computer storage media. For example, the secondary storage device 706 can comprise one or more magnetic disks, magnetic tape drives, optical discs, solid state memory devices, and/or other types of computer storage media.

The network interface card 708 enables the computing device 700 to send data to and receive data from a communication network. In different embodiments, the network interface card 708 is implemented in different ways. For example, the network interface card 708 can be implemented as an Ethernet interface, a token-ring network interface, a fiber optic network interface, a wireless network interface (e.g., WiFi, WiMax, etc.), or another type of network interface.

The video interface 710 enables the computing device 700 to output video information to the display unit 712. The display unit 712 can be various types of devices for displaying video information, such as a cathode-ray tube display, an LCD display panel, a plasma screen display panel, a touch-sensitive display panel, an LED screen, or a projector. The video interface 710 can communicate with the display unit 712 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 714 enables the computing device 700 to communicate with external devices. For example, the external component interface 714 can be a USB interface, a FireWire interface, a serial port interface, a parallel port interface, a PS/2 interface, and/or another type of interface that enables the computing device 700 to communicate with external devices. In various embodiments, the external component interface 714 enables the computing device 700 to communicate with various external components, such as external storage devices, input devices, speakers, modems, media player docks, other computing devices, scanners, digital cameras, and fingerprint readers.

The communications medium 716 facilitates communication among the hardware components of the computing device 700. In the example of FIG. 7, the communications medium 716 facilitates communication among the memory 702, the processing system 704, the secondary storage device 706, the network interface card 708, the video interface 710, and the external component interface 714. The communications medium 716 can be implemented in various ways. For example, the communications medium 716 can comprise a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 702 stores various types of data and/or software instructions. For instance, in the example of FIG. 7, the memory 702 stores a Basic Input/Output System (BIOS) 718 and an operating system 720. The BIOS 718 includes a set of computer-executable instructions that, when executed by the processing system 704, cause the computing device 700 to boot up. The operating system 720 includes a set of computer-executable instructions that, when executed by the processing system 704, cause the computing device 700 to provide an operating system that coordinates the activities and sharing of resources of the computing device 700. Furthermore, the memory 702 stores application software 722. The application software 722 comprises computer-executable instructions, that when executed by the processing system 704, cause the computing device 700 to provide one or more applications. The memory 702 also stores program data 724. The program data 724 is data used by programs that execute on the computing device 700.

The various embodiments described above are provided by way of illustration only and should not be construed as limiting. Those skilled in the art will readily recognize various modifications and changes that may be made without following the example embodiments and applications illustrated and described herein. For example, the operations shown in the figures are merely examples. In various embodiments, similar operations can include more or fewer steps than those shown in the figures. Furthermore, in other embodiments, similar operations can include the steps of the operations shown in the figures in different orders.

What is claimed is:
1. A computing system comprising:
one or more computer storage media having computer-executable instructions stored thereon; and
a processing system that is configured to execute the computer-executable instructions, the execution of the computer-executable instructions causing the computing system to perform acts via a client access server, the acts comprising:

receiving a first primary request at a first server, the first primary request associated with a client;

processing the first primary request, wherein processing the first primary request comprises sending a first secondary request from the first server to a second server, wherein processing the first primary request further comprises waiting to send the first secondary request to the second server until a current pending request count is less than a maximum pending request count, the current pending request count indicating how many requests sent by the first server are currently pending at the second server; and automatically and dynamically adjusting the maximum pending request count based on a number of request threads that have secondary requests pending at the second server for longer than a given time limit.

2. The computing system of claim 1, wherein processing the first primary request comprises waiting for a delay period to expire before sending the first secondary request to the second server and calculating a duration of the delay period such that the duration of the delay period is substantially equal to a latency level of the client with regard to a computing resource multiplied by a quotient of an average latency level of the resource divided by an established latency level for the resource.

3. The computing system of claim 1, wherein processing the first primary request comprises waiting for a delay period to expire before sending the first secondary request to the second server and sending, by the first server, the first secondary request to the second server without waiting for the delay period to expire when the client is a priority client.

4. The computing system of claim 1,
wherein the client is a member of a group;
wherein processing the first primary request comprises waiting for a delay period to expire before sending the first secondary request to the second server; and
wherein a duration of the delay period is dependent on latency levels of other members of the group with regard to a computing resource.

5. The computing system of claim 1, wherein processing the first primary request comprises waiting for a delay period to expire before sending the first secondary request to the second server, and wherein the acts comprise calculating a duration of the delay period, the calculation of the duration of the delay period including performing a mathematical calculation on a latency level of the client with regard to a computing resource, the calculation of the duration of the delay period comprising increasing the duration of the delay period in response to an increase in the latency level of the client with regard to the resource.

6. The computing system of claim 1, wherein the acts further comprise:
waiting to send a second secondary request to the second server until the current pending request count is less than the maximum pending request count;
determining that the second server is unhealthy when the first server has waited to send the second secondary request for longer than a timeout limit;
receiving, by the first server, a third primary request; and
after determining that the second server is unhealthy, processing the third primary request, wherein processing the third primary request comprises generating an error instead of sending a third secondary request to the second server.

7. The computing system of claim 1, wherein the acts further comprise:
receiving, by the first server, a second primary request; and
wherein processing the second primary request comprises:
determining that a waiting pool contains multiple request threads, each request thread in the waiting pool waiting to send a secondary request to the second server because the current pending request count is not less than the maximum pending request count;
determining that the current pending request count has dropped below the maximum pending request count;
selecting request threads from the waiting pool based on relative health levels of resources involved with the secondary requests to be sent by the request threads; and
sending the secondary requests of the selected request threads to the second server.

8. The computing system of claim 1, wherein the first server is a client access server, the second server is a hosted email server, and the first primary request comprises a request to access data in an email mailbox.

9. The computing system of claim 1, wherein processing the primary request comprises:
recording a start time for the first secondary request, the start time for the first secondary request indicating a time at which the first server sent the first secondary request to the second server;
recording an end time for the first secondary request, the end time for the first secondary request indicating a time at which the first server received from the second server a response to the first secondary request;
receiving, by the first server, a second primary request associated with the client;
processing the second primary request, wherein processing the second primary request comprises:
using the start time and the end time for the first secondary request to determine an updated latency level of the client with regard to a computing resource; and
sending, by the first server, a second secondary request to access the resource after a second delay period expires, a duration of the second delay period depending at least in part on the updated latency level of the client with regard to the resource.

10. The computing system of claim 1, further comprising:
receiving, by the first server, a second primary request with regard to a computing resource, the second primary request being associated with the client; and
processing the second primary request, wherein processing the second primary request comprises:
determining that an average latency level for the resource is less than an established latency level for the resource; and
after determining that the average latency level for the resource is less than the established latency level for the resource, sending a second secondary request to the second server without waiting for expiration of a delay period whose duration depends on the latency level of the client with regard to the resource.

11. A computer-implemented method comprising performing the following acts via a computer system:
receiving a first primary request associated with a client;
processing the first primary request to generate a first response message, the first response message responsive to the first primary request, wherein processing the first primary request comprises sending a first secondary request to a backend server, sending of the first secondary request to the backend server comprising waiting to send the first secondary request to the backend server until a current pending request count for the backend server is less than a maximum pending request count for the backend server;

increasing the maximum pending request count for the backend server when a number of unhealthy request threads decreases; and decreasing the maximum pending request count for the backend server when the number of unhealthy request threads increases.

12. The computer-implemented method of claim 11, wherein processing the first primary request comprises waiting for a first delay period to expire before sending the first secondary request to the backend server, and wherein the acts comprise calculating a duration of the first delay period such that the duration of the first delay period is substantially equal to a recent latency level of the client with regard to a first resource multiplied by a quotient of an average latency level of the first resource divided by an established latency level for the first resource.

13. The computer-implemented method of claim 12, wherein calculating the duration of the first delay period comprises calculating the average latency level of a computing resource using latencies of secondary requests associated with multiple clients.

14. The computer-implemented method of claim 12, wherein the acts further comprise:

receiving a second primary request associated with the client; and processing the second primary request, wherein processing the second primary request comprises sending a second secondary request to the backend server after a second delay period expires, processing of the second secondary request requiring access to a second resource of the backend server, a duration of the second delay period depending at least in part on a recent latency level of the client with regard to the second resource, an average latency level of the second resource, and an established latency level of the second resource.

15. The computer-implemented method of claim 11, wherein processing the first primary request comprises waiting for a first delay period to expire before sending the first secondary request to the backend server, and wherein the acts comprise sending secondary requests associated with priority clients to the backend server without waiting for expiration of delay periods whose durations depend on recent latency levels of the priority clients with regard to resources of the backend server.

16. The computer-implemented method of claim 11, wherein the acts comprise sending the first secondary request to the backend server by sending a message over a network from a first computing device to a second computing device, the second computing device providing the backend server, and the acts being performed via the first computing device.

17. The computer-implemented method of claim 11, wherein processing the first primary request comprises waiting for a first delay period to expire before sending the first secondary request to the backend server, and wherein a duration of the delay period depends at least in part on a mathematical calculation performed on a latency level of the client with regard to a first resource, the mathematical calculation yielding an increase in the duration of the delay period in response to an increase in the latency level of the client with regard to the first resource.

18. A computer-implemented method comprising:

receiving a primary request associated with a client, the client belonging to a group, the group comprising one or more clients;

processing the primary request, wherein processing the primary request comprises: calculating a duration of a delay period, the calculation of the duration of the delay period comprising performing one or more sub-calculations equal to multiplying W by AL, and dividing by HL, where W is a recent latency level of the group with regard to a computing resource of a backend server, AL is an average latency level of the resource, and HL is an established latency level of the resource; and sending a secondary request to the backend server after waiting for the delay period to expire, the secondary request involving the resource.

19. The method of claim 18, wherein the duration of the delay period is equal to $W*(AL/HL)$.

20. The method of claim 18, wherein sending the secondary request to the backend server comprises sending the secondary request after waiting for the delay period to expire and after waiting until a current pending request count is less than a maximum pending request count, the current pending request count indicating how many secondary requests are currently pending at the backend server.

* * * * *